Figure 1:
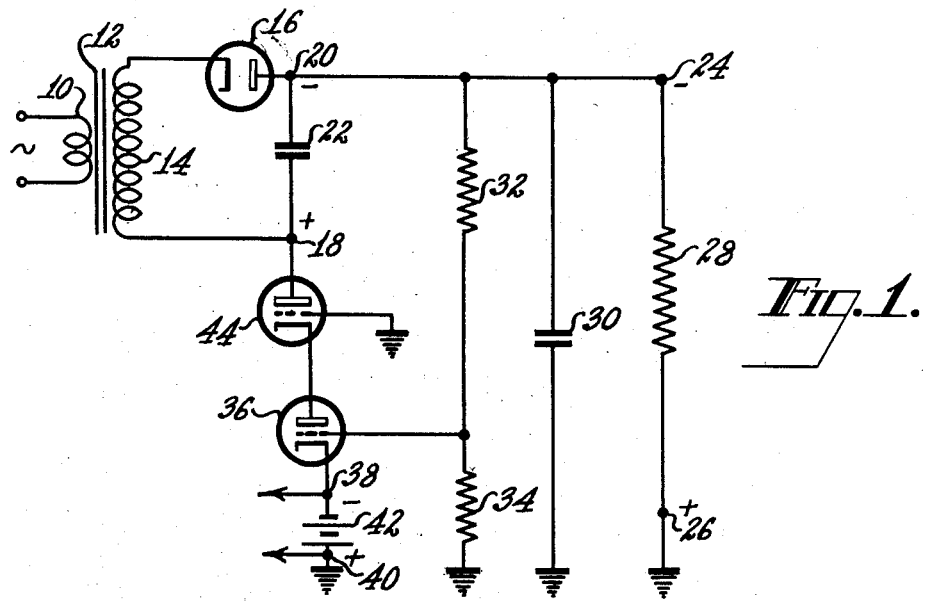

June 17, 1958   M. M. MANDELKEHR ET AL   2,839,717
VOLTAGE REGULATOR
Filed Feb. 25, 1954

INVENTORS
MAURICE M. MANDELKEHR
& CHARLES L. OLSON
BY Morrish Rabkin
ATTORNEY

United States Patent Office 2,839,717
Patented June 17, 1958

2,839,717

VOLTAGE REGULATOR

Maurice M. Mandelkehr, Camden, and Charles L. Olson, Collingswood, N. J., assignors to Radio Corporation of America, a corporation of Delaware Application February 25, 1954, Serial No. 412,435

9 Claims. (Cl. 323—22)

This invention relates generally to voltage regulators and D. C. amplifiers. More particularly, the invention relates to a fail-safe voltage regulator for use in a relatively high, unidirectional, negative output voltage power supply. The voltage regulator circuit of the present invention may be used also as a D. C. amplifier without substantially changing the circuitry of the voltage regulator.

In the usual, regulated, D. C. power supply, an output voltage is maintained substantially constant by feeding back a sample of the output voltage degeneratively to the grid of a series rheostat tube, connected between a source of unregulated voltage and a load. The voltage sampling is usually performed by a control tube connected in parallel with the source of unregulated voltage, and the fed back voltage is from the anode of the control tube to the grid of the series rheostat tube. In most of these prior art voltage regulators, the output voltage will increase above a desired constant value if the control tube, and/or one or more amplifier tubes between the control tube and the series rheostat tube, were to become inoperative. The reason for this increased output voltage is the voltage at the grid of the series rheostat tube usually goes positive in the absence of control thereof by the feedback circuit, which includes the control tube and the amplifier tubes. The resulting increased output voltage of the power supply may cause serious damage to delicate equipment in the load circuit.

Accordingly, it is a principal objective of the present invention to provide a novel and improved voltage regulator circuit which will render a power supply employing it fail-safe in the event that any of the tubes in the regulator circuit burn out, and/or in the event that the load is shorted.

It is another objective of the present invention to provide an improved voltage regulator that is easily applicable to a power supply adapted to provide a negative output voltage of a relatively high amplitude.

It is a further object of the present invention to provide a voltage regulator circuit which may be used as a D. C. amplifier capable of handling input signals of relatively high voltages, with good linearity and insensitivity to supply voltage variations, tube characteristics variations and load impedance variations.

Still another object of the present invention is to provide an improved, regulated power supply that can function as a highly efficient D. C. amplifier.

Still a further object of the present invention is to provide a novel and improved combination of a voltage regulator and a D. C. amplifier which is simple in construction, simple in operation, and yet highly efficient in use.

In general, the foregoing and other objects and advantages of the present invention are accomplished by a novel circuit that may function either as a voltage regulator for a unidirectional power supply, or as a D. C. amplifier. When used as a voltage regulator, the novel circuit of the present invention employs a control tube and one or more amplifying tubes connected in series with each other, and connected also in series with a source of unregulated voltage and the regulated output voltage terminals. A sample of the output voltage is fed back from a bleeder resistor to the control grid of the control tube. Each of the grids of the amplifying tubes are maintained at a fixed potential with respect to one of the output terminals, which is usually at ground potential. A source of fixed, unidirectional potential is connected in the grid-cathode circuit of the control tube. When the circuit of the present invention is functioning as a voltage regulator, the regulated output voltage across the regulated output voltage terminals may be considered as an amplification of the fixed voltage in the grid-cathode circuit of the control tube. When the circuit of the present invention is functioning as a D. C. amplifier, the source of fixed potential in the grid-cathode circuit of the control tube is removed and replaced by input signal voltages. The amplified output voltages appearing across the regulated output voltage terminals are proportional to the input signal voltages.

Figure 2:
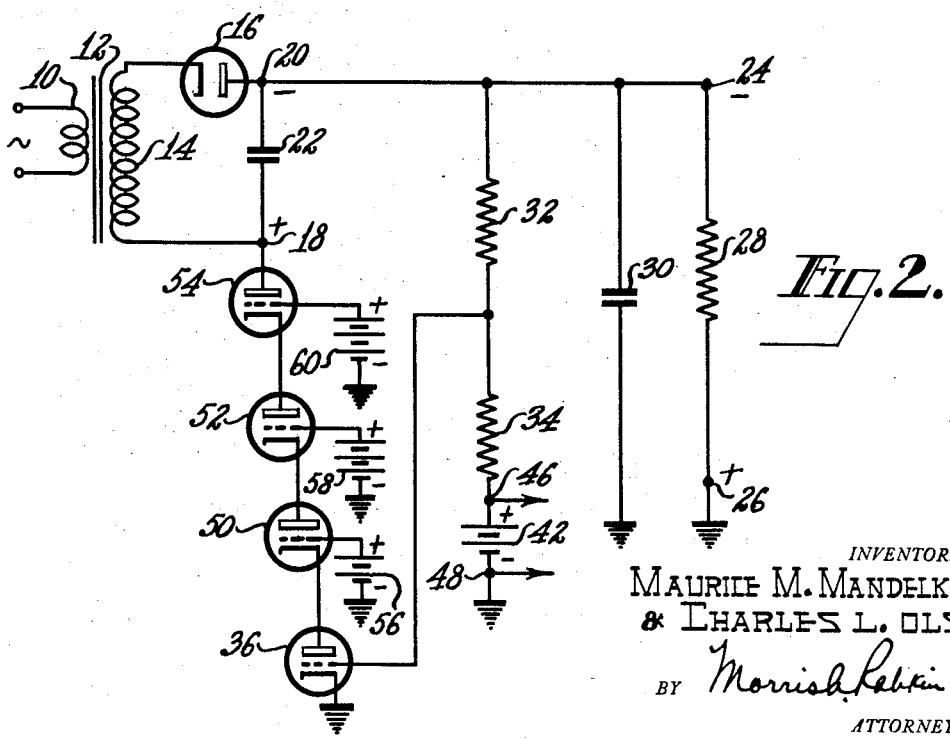

The novel features of the invention, as well as the invention itself, both as to its organization and method of operation will be understood in detail from the following description when considered in connection with the accompanying drawing in which similar elements have similar reference characters, and in which:

Fig. 1 is a schematic diagram of a regulated power supply employing a circuit adapted to function either as a voltage regulator or as a D. C. amplifier, in accordance with the present invention, and Fig. 2 is a schematic diagram of a regulated power supply, substantially similar to that of Fig. 1, but employing two additional stages of amplification, in accordance with the present invention.

Referring now particularly to Fig. 1, there is shown a circuit of a regulated D. C. power supply which derives its energy from any suitable source of A. C. voltage (not shown) adapted to be applied across the primary winding 10 of an input transformer 12. One end of a secondary winding 14 of the transformer 12 is connected to the cathode of a rectifier tube 16, and the other end is connected to an unregulated positive output voltage terminal 18. The anode of the rectifier tube 16 is connected to an unregulated negative output voltage terminal 20. A storage impedance or filter capacitor 22 is connected between the unregulated negative and positive output voltage terminals 20 and 18. The voltage across the terminals 18 and 20 represents a source of unregulated voltage that is to be regulated by the voltage regulator of the present invention.

The terminal 20 is connected to a regulated negative output voltage terminal 24. A regulated positive output voltage terminal 26 is connected to a source of reference potential, such as ground. A load impedance 28, represented as a resistor, is connected across the output terminals 24 and 26, and is adapted to receive a substantially constant voltage thereacross. Since the positive terminal 26 of the regulated power supply is grounded, the power supply is referred to as a negative output voltage supply.

A filter capacitor 30 may be connected across the output voltage terminals 24 and 26 for filtering purposes. A bleeder or voltage divider, comprising resistors 32 and 34 connected in series with each other, is connected in series with the output terminals 24 and 26. A point on the bleeder, namely the junction of the resistors 32 and 34 is connected to the control grid of an electron discharge device, or control tube 36.

The cathode of the control tube 36, which is essentially an amplifier, is connected to a terminal 38. Another terminal 40 is connected to ground. A voltage source 42 of fixed, unidirectional potential, such as a battery has its negative terminal connected to the terminal 38, and its positive terminal connected to the terminal 40. The voltage of the voltage source 42 is of a magnitude that will make the cathode of the control tube 36 slightly positive with respect to the control grid 36, under normal operating conditions.

The anode of the control tube 36 is connected to the cathode of an electron discharge device, such as an amplifier tube 44. The control grid of the amplifier tube 44 is connected to a source of potential which is a fixed potential with respect to the positive output voltage terminal 26. Where only one amplifier tube is used, in addition to the control tube 36, and the voltage source 42 is carefully chosen, the control grid of the amplifier tube 44 may be grounded, as shown.

The anode of the amplifier tube 44 is connected to the terminal 18 of the source of unregulated voltage. It is important to note that with respect to the circuitry of the regulated power supply of Fig. 1, that a single series circuit is provided by the negative output voltage terminal 24, the source of unregulated voltage across the terminals 20 and 18, the amplifier tube 44, the control tube 36, the voltage source 42 and the positive output voltage terminal 26. It will be noted, also, that the current flowing through the load 28 flows through the source of unregulated voltage, the amplifier tube 44, the control tube 36, and the voltage source 42. It is because of this series circuit arrangement, that the regulated power supply of Fig. 1 has fail-safe features. For example, if any of the filaments (not shown) of the tubes 36 and 44 were to burn out, and either one or both of these tubes were to become inoperative, the output voltage across the terminals 24 and 26 would drop to substantially zero.

The operation of the regulated power supply of Fig. 1, in accordance with the present invention, as a negative output voltage power supply, will now be described. Let it be assumed that because of a sudden surge in the A. C. input voltage to the primary 10 of the transformer 12, and/or because of a sudden increase in the impedance of the load 28, there is a tendency for the output voltage across the terminals 24 and 26 to increase. Since the output terminal 26 is connected to ground, the voltage at the negative output terminal 24 will tend to go more negative under these conditions. Consequently, a sample of this instantaneous negative-going voltage is sampled by the grid of the control tube 36. Since the cathode of the control tube 36 is maintained at a fixed potential with respect to ground, the negative-going voltage at the control grid of the tube 36 will tend to decrease the flow of current through the control tube 36. Under these conditions, a positive-going voltage is derived at the anode of the control tube 36 which is applied to the cathode of the amplifier tube 44. Since the control grid of the amplifier tube 44 is maintained at a fixed potential with respect to ground, the positive-going voltage at the cathode of the amplifier tube 44 will cause a decrease in the current flowing through the amplifier tube 44. The decrease in current through the amplifier tube 44 will cause the voltage at the anode thereof to go positive. The positive-going voltage at the anode of the tube 44 will cause the negative terminal 20, of the unregulated source of voltage, to go slightly positive and overcome the original tendency of the regulated, output voltage terminal 24 to go negative. A tendency for the regulated output voltage across the output terminals 24 and 26 to decrease will result in a reverse set of conditions, whereby this tendency will be offset.

It will be noted that if the load 28 were shorted, the voltage at the grid of the control tube 36 would go positive. As soon as the control grid of the control tube 36 becomes more positive than its cathode, the control grid will begin drawing current. Under these conditions, a potential drop due to this grid current develops across the resistors 32 and 34, since they may now be considered as being connected in parallel. This limits the positive rise in voltage at this control grid of the control tube 36. Because of the series circuit arrangement described, a limitation of current through the control tube 36 results in a limitation of current through the rest of the series circuit.

While the source of unregulated, unidirectional voltage across the terminals 18 and 20 is shown as being produced by the rectification of an alternating voltage by means of the rectifier tube 16, it will be understood that the rectifier tube 16 is merely representative of one of many of the rectifiers that may be used in accordance with the power supply of the present invention. Consequently, the rectifier 16 may be of the dry type, such as the selenium and germanium type rectifiers.

The regulated power supply of Fig. 1 may be regarded as a D. C. amplifier wherein the voltage source 42, connected between the terminals 38 and 40, is amplified as the regulated output voltage across the output terminals 24 and 26. In other words, the schematic diagram of Fig. 1 represents a D. C. amplifier which is a regulated power supply when the input voltage to the terminals 38 and 40 is a source of fixed, unidirectional voltage, such as the battery 42. It will be noted, however, that the output voltage across the output terminals 24 and 26 will be proportional to, and vary with, any input signal voltages applied between the input terminals 38 and 40. Since the D. C. amplifier of Fig. 1 has means, as described above, for regulating the voltage supply, it is insensitive to variations in the supply voltage, variations in tube characteristics, and is capable of handling signal voltages of relatively large amplitudes.

Referring now to Fig. 2, there is shown a regulated power supply and/or D. C. amplifier, in accordance with the present invention, of greater sensitivity than shown in Fig. 1. When the load 28 draws a relatively large amount of current, the voltage source 42 may be connected between ground and one end of the resistor 34. In this case, the positive terminal of the fixed voltage source 42 is connected to a terminal 46, which is also connected to the lower end of the resistor 34, and the negative terminal of the voltage source 42 is connected to a terminal 48 which is grounded. It will be understood that, in many applications of the present inventions, the voltage source 42 may also be connected in series with the control tube 36, as shown in Fig. 1.

Where more than one stage of amplification is desired in order to provide a regulated power supply and/or D. C. amplifier of increased sensitivity, a plurality of amplifier devices are connected in series with the control tube 36 and the source of unregulated unidirectional voltage across the terminals 18 and 20. To this end, amplifier tubes 50, 52 and 54 are connected in series with each other, between the source of unidirectional voltage across the terminals 20 and 18 and the control tube 36, and in series therewith. Thus, the cathode of the amplifier tube 50 is connected to the anode of the control tube 36, and the anode of the amplifier tube 54 is connected to the positive unregulated output voltage terminal 18.

Means are provided to maintain the control grids of the amplifier tubes 50, 52 and 54, respectively, at fixed potentials with respect to the grounded, positive output terminal 26. To this end, a source of unidirectional voltage 56 is connected between the control grid of the amplifier tube 50 and ground, in a manner to maintain the control grid positive with respect to ground and to cause conduction through the tube 50. The control grid of the amplifier tube 52 is maintained positive with respect to ground by means of a fixed, voltage source 58 and the control grid of the amplifier tube 54 is maintained positive with respect to ground by a fixed voltage source 60. The source of voltage 60 will be greater than the source of voltage 58, and the source of voltage 58 will be greater than the source of voltage 56. The magnitude of the voltage sources 56, 58 and 60 will be such as to maintain continuous conduction through the amplifier tubes 50, 52 and 54, respectively. In the embodiment of the invention shown in Fig. 2, the cathode of the control tube 36 is grounded. It will be noted that in Fig. 2, as in Fig. 1, a series circuit is provided by the negative output voltage terminal 24, the source of unregulated voltage across the terminals 20 and 18, the amplifier tubes 54, 52 and 50, the control tube 36, and the output voltage terminal 26.

The operation of the circuit of Fig. 2, as a regulated power supply, will now be described. This time, let it be assumed that because of a sudden decrease in the A. C. input voltage to the primary 10 of the transformer 12, and/or a sudden decrease in the resistance of the load 28, there is a tendency for the output voltage across the output terminals 24 and 26 to decrease. Since the output terminal 26 is connected to ground, there will be a tendency for the voltage at the negative output terminal 24 to go positive under these conditions. This tendency is offset in the following manner: A sample of the resulting positive-going output voltage is applied to the control grid of the control tube 36. Since the cathode of the control grid 36 is at a fixed potential with respect to ground, the positive-going grid will cause more current to be conducted through the control tube 36. Consequently, the anode of the control tube 36 will tend to go negative. This negative-going voltage is now applied to the cathode of the amplifier tube 50. Because the grid of the amplifier tube 50 is maintained at a constant voltage by the voltage source 56, conduction through the tube 50 will increase and cause the anode thereof to go negative. This negative-going voltage is applied to the cathode of the amplifier tube 52. As a result of the amplifying action of the amplifier tube 52, an amplified negative-going voltage is now obtained at the anode thereof and applied to the cathode of the amplifier tube 54. In a similar manner, the amplifier tube 54 will provide an amplified negative voltage at the anode of the tube 54 which will be applied to the positive terminal 18 and transmitted through the capacitor 22 to the terminal 20 which will tend to go negative. Thus, it will be understood that the negative-going voltage at the terminal 20 will tend to offset the original positive-going voltage at the output terminal 24, and thereby provide a substantially constant, regulated, output voltage across the terminals 24 and 26. A tendency for the voltage across the terminals 24 and 26 to increase will cause a reverse chain of events to take place, whereby the tendency of the output voltage to increase will be offset.

The regulated power supply of Fig. 2 may be regarded as a D. C. amplifier wherein a fixed input signal voltage, as for example the voltage source 42, is amplified to provide a fixed amplified output voltage across the output terminals 24 and 26. Where the D. C. amplifier of Fig. 2 is to be used to amplify input signal voltage of varying amplitudes, the fixed voltage source 42 is removed and the input signal voltages are applied between the terminals 46 and 48. Under these conditions, the amplified output voltages across the output terminals 24 and 26 will be substantially proportional in amplitude to the input signal voltages between the terminals 46 and 48. With the circuitry shown and described in Fig. 2, it will be seen that the source of operating voltage, for the D. C. amplifier, namely the source of unregulated voltage across the terminals 18 and 20, is regulated by sampling a portion of the amplified output voltage by means of the bleeder and the control grid of the control tube 36 connected thereto. Thus, the D. C. amplifier employs a regulated source of operating voltage and thereby provides a signal output voltage which is insensitive to variations in the supply voltage, variations in the tube characteristics, and variations in load impedance. Also, the signal handling capacity of the D. C. amplifier of Fig. 2 may be relatively large.

It will be noted, also, that the series circuit arrangement, whereby the control tube 36, the amplifier tubes 50, 52 and 54, the source of unregulated voltage across the terminals 18 and 20, and the output terminals 24 and 26 are in series with each other, provides the regulated power supply and/or D. C. amplifier of Fig. 2 with the fail-safe features described in Fig. 1. For instance, if any one of the filaments (not shown) of the tubes 36, 50, 52 and 54 were to burn out, the output voltage across the output terminals 24 and 26 would drop to substantially zero. Under these conditions, damage to the load 28, which may be very sensitive equipment, is prevented.

Regulated power supplies, in accordance with the present invention, as illustrated in Figs. 1 and 2, have been used satisfactorily to provide negative output voltages in the neighborhood of 1000 volts. Also, input signals in the neighborhood of 150 volts have been amplified satisfactorily when the described equipment was used as a D. C. amplifier. These examples are mentioned by way of illustration only, and are not intended in a limiting sense.

Thus, there has been shown and described, in accordance with the objects and advantages of the present invention, novel power supplies having fail-safe features. The fail-safe features reside in a circuit arrangement whereby a source of unregulated voltage is connected in series with a control tube that does the voltage sampling, one or more amplifier tubes and the output terminals. Each of the grids of the amplifier tubes are maintained at a fixed potential with respect to one of the output terminals. When used as a D. C. amplifier, the apparatus in accordance with the present invention provides a regulated source of operating voltage for the amplifier tubes, thereby providing output signal voltages which are substantially free from distortion usually caused by variations in supply voltage, tube characteristics, and load impedance.

What is claimed is:

1. In apparatus of the type wherein a source of unregulated unidirectional voltage is regulated to provide a substantially constant output voltage across a pair of output terminals, means comprising a control device to sample said output voltage, amplifying means having a control grid, means fixing said control grid at a desired voltage with respect to one of said output terminals, and means connecting said source, said amplifying means, said control device and said output terminals in a series circuit.

2. In apparatus of the type wherein a source of unregulated unidirectional voltage is regulated to provide a substantially constant output voltage across a pair of output terminals, means comprising a control device to sample said output voltage, amplifying means, means connecting said source, said amplifying means, said control device and said output terminals in a series circuit, said control device and said amplifying means comprising a pair of electron tubes each having an anode, a grid and a cathode, said sampling means comprising a bleeder connected between said output terminals, a grid of one of said pair of tubes being connected to said bleeder, and a grid of the other of said pair of tubes being at a voltage fixed with respect to one of said output terminals.

3. In apparatus of the type wherein a source of unregulated unidirectional voltage is regulated to provide a substantially constant output voltage across a pair of output terminals, means comprising a control device to sample said output voltage, amplifying means having a control grid, means fixing said control grid at a desired voltage with respect to one of said output terminals, means connecting said source, said amplifying means, said control device and said output terminals in a series circuit, and said connecting means comprising a second source of voltage connected between one of said output terminals and said control device.

4. In apparatus of the type wherein a source of unregulated unidirectional voltage is regulated to provide a substantially constant output voltage across a pair of output terminals, means comprising a control device to sample said output voltage, amplifying means, means connecting said source, said amplifying means, said control device and said output terminals in a series circuit, said amplifying means comprising a plurality of electron tubes each having an anode, a grid and a cathode, said electron tubes being connected in series with each other, and means fixing the grid of each of said tubes at a desired potential with respect to one of said output terminals.

5. In apparatus of the type wherein a source of unregulated unidirectional voltage is regulated to provide a substantially constant output voltage across a pair of output terminals, means comprising a control device to sample said output voltage, amplifying means, means connecting said source, said amplifying means, said control device and said output terminals in a series circuit, said control device and said amplifying means comprising a pair of electron tubes each having an anode, a grid and a cathode, said sampling means comprising a bleeder connected between said output terminals, a grid of one of said pair of tubes being connected to said bleeder, means to fix the grid of the other of said pair of tubes at a desired voltage with respect to one of said output terminals, and said connecting means comprising a second source of voltage connected between said one of said output terminals and said cathode of said control device.

6. In apparatus of the type wherein a source of unregulated unidirectional voltage is regulated to provide a substantially constant output voltage across a pair of output terminals, means comprising a control device to sample said output voltage, amplifying means, and means connecting said source, said amplifying means, said control device and said output terminals in a series circuit, said control device having a grid-cathode circuit, a portion of said connecting means being in said grid-cathode circuit, and said portion comprising a second source of voltage connected in said series circuit.

7. In apparatus of the type wherein a source of unregulated unidirectional voltage is regulated to provide a substantially constant output voltage across a pair of output terminals, means comprising a control device to sample said output voltage, amplifying means, and means connecting said source, said amplifying means, said control device and said output terminals in a series circuit, said control device having a grid-cathode circuit, a portion of said connecting means being in said grid-cathode circuit, and a second source of voltage connected in said grid-cathode circuit.

8. Apparatus comprising a first source of unregulated unidirectional voltage having negative and positive output means, a negative output voltage terminal connected to said negative output means, a positive output voltage terminal, a bleeder connected between said negative and said positive output voltage terminals, a second source of voltage, a pair of electron tubes each having a cathode, a grid and an anode, said pair of tubes being connected in series with each other between said first and said second sources and in series therewith, means to fix said grid of one of said pair of tubes at a desired potential with respect to said positive output voltage terminal, said grid of the other of said pair of tubes being connected to said bleeder, and said second source being connected between said cathode of said other of said pair of tubes and said positive output voltage terminal.

9. Apparatus comprising a first source of unregulated unidirectional voltage, a pair of output terminals, a bleeder connected between said output terminals, a plurality of electron tubes each having an anode, a grid and a cathode, said tubes being connected in series with each other and in series with said first source and said output terminals, a grid of one of said tubes being connected to said bleeder, means to bias each of the grids of each of the others of said tubes with a separate fixed potential with respect to one of said terminals, said one of said tubes having a grid-cathode circuit including means applying a second source of voltage therein.

References Cited in the file of this patent

UNITED STATES PATENTS

| | | |
|---|---|---|
| 2,576,056 | Wannamaker | Nov. 20, 1951 |
| 2,592,193 | Saunders | Apr. 8, 1952 |
| 2,740,089 | Johnson | Mar. 27, 1956 |